United States Patent
Correa Bahnsen et al.

(10) Patent No.: US 11,178,163 B2
(45) Date of Patent: Nov. 16, 2021

(54) LOCATION SPOOFING DETECTION USING ROUND-TRIP TIMES

(71) Applicant: Easy Solutions Enterprises Corp., Doral, FL (US)

(72) Inventors: Alejandro Correa Bahnsen, Bogota (CO); Claudio Deiro, Bogota (CO); Martín Ochoa Ronderos, Bogotá D.C. (CO); Javier Fernando Vargas Gonzalez, Bogota D.C. (CO); Jesus Alberto Solano Gomez, Bogotá D.C. (CO)

(73) Assignee: Easy Solutions Enterprises Corp., Doral, FL (US)

( * ) Notice: Subject to any disclaimer, the term of this patent is extended or adjusted under 35 U.S.C. 154(b) by 199 days.

(21) Appl. No.: 16/460,649

(22) Filed: Jul. 2, 2019

(65) Prior Publication Data

US 2021/0006579 A1  Jan. 7, 2021

(51) Int. Cl.
| | |
|---|---|
| *H04L 29/06* | (2006.01) |
| *H04L 12/26* | (2006.01) |
| *H04L 29/12* | (2006.01) |
| *H04L 12/46* | (2006.01) |

(52) U.S. Cl.
CPC .......... *H04L 63/1425* (2013.01); *H04L 43/08* (2013.01); *H04L 61/2007* (2013.01); *H04L 63/1466* (2013.01); *H04L 12/4633* (2013.01); *H04L 69/16* (2013.01)

(58) Field of Classification Search
CPC . H04L 63/1425; H04L 43/08; H04L 61/2007; H04L 63/1466
See application file for complete search history.

(56) References Cited

U.S. PATENT DOCUMENTS

| | | | | |
|---|---|---|---|---|
| 2014/0380424 | A1* | 12/2014 | Thompson | H04L 63/08 726/4 |
| 2015/0215762 | A1* | 7/2015 | Edge | H04W 4/02 370/338 |
| 2017/0070533 | A1* | 3/2017 | Bailey | G06F 16/24578 |
| 2017/0091008 | A1* | 3/2017 | Cherbakov | G06F 11/079 |
| 2018/0212849 | A1* | 7/2018 | Hobgood | G06F 11/30 |
| 2018/0309822 | A1* | 10/2018 | Baradaran | H04L 41/142 |
| 2019/0075131 | A1* | 3/2019 | Nathan | H04L 67/18 |
| 2020/0267068 | A1* | 8/2020 | Johnsson | H04L 43/08 |

* cited by examiner

*Primary Examiner* — Christopher B Robinson
(74) *Attorney, Agent, or Firm* — Greenberg Traurig

(57) ABSTRACT

The disclosed techniques utilize round-trip times (RTTs) from back-and-forth communications with distant servers to detect impersonations in a computer network, such as impersonations using IP spoofing. Also, the techniques can use machine learning to enhance analysis in spoofing detection. The techniques can include sending a computer program to a client device. The client device can have an IP address, and the computer program can be executed by the client device after it is received by the client device. The computer program can measure RTTs for messages the computer program sends to multiple pre-selected location servers at different remote or distant locations and for corresponding reply messages that are returned to the computer program. The IP address of the client device and the measured RTTs can then be received and used to determine whether the measured RTTs are anomalous or not; and thus, determine a possible impersonator or a legitimate user.

18 Claims, 7 Drawing Sheets

200

202
determining one or more expected ranges of time based on a model of round-trip times (RTTs) for the location servers mentioned in block 204 and for known client devices having a predetermined range of IP addresses including the IP address of the client device mentioned in block 204

204
sending, by one or more computing devices, a computer program and web content to a client device
- (the client device has an IP address)
- (the program executes on the client device after it is received by the client device)
- (the program measures round-trip times (RTTs) for messages the program sends to location servers at different remote locations and for corresponding reply messages that are returned to the computer program)

206 receiving, from the computer program, the IP address of the client device and the measured RTTs?

N → performing, by the one or more computing devices, a security action 214

Y ↓

208 determining, by the one or more computing devices, whether the measured round-trip times (RTTs) are anomalous or within one or more expected ranges of time for the multiple pre-selected location servers anomalous?

N → 212 providing, by the one or more computing devices, web content without performing the security action, in response to determining the measured RTTs are within the one or more expected ranges of time Y → 210 performing, by the one or more computing devices, a security action, in response to determining the measured round-trip times (RTTs) are anomalous

FIG. 2

LOCATION SPOOFING DETECTION USING ROUND-TRIP TIMES

TECHNICAL FIELD

Embodiments of the disclosure relate generally to location spoofing detection using round-trip times (RTTs).

BACKGROUND

Spoofing attacks in computer networks are becoming a cause for concern. Spoofing attacks often include a person or program successfully masquerading as another by falsifying data, to gain illegitimate access to a computer network or a website. Unfortunately, several of the protocols of Transmission Control Protocol/Internet Protocol (TCP/IP) do not provide mechanisms for authenticating the source or destination of a message. Thus, such computer network protocols are vulnerable to spoofing attacks when extra precautions are not taken by applications to verify the identity of the sending or receiving host.

Common types of spoofing attacks include IP spoofing and Address Resolution Protocol (ARP) spoofing. Such attacks may be used to implement man-in-the-middle attacks against hosts on a computer network. Spoofing attacks which take advantage of TCP/IP protocols may be managed with the use of firewalls capable of deep packet inspection or by taking measures to verify the identity of the sender or recipient of a message. However, firewalls have problems as well, such as complicating administration of computer networks, creating a non-transparent layer for admin, and in general are difficult to configure and use.

Also, attackers can impersonate users by means of network tunneling (such as tunneling through virtual private networks (VPNs), anonymity networks, and proxies). Web services often use Internet Protocol (IP) addresses and such services can determine geo-location to fingerprint a user (such as a known user). Threat actors or other types of attackers can obtain a similar IP of a legitimate or known user to reduce the chance of detection.

SUMMARY

Examples of the systems and methods disclosed herein for implementing location spoofing detection using round-trip times (RTTs) provide specific technical solutions to at least the technical problems mentioned in the background section and other parts of the application as well as other technical problems not described herein but recognized by those of skill in the art.

The disclosed techniques utilize round-trip times (RTTs) from back-and-forth communications with distant servers to detect impersonations in a computer network, such as impersonations using IP spoofing. Also, the techniques can use machine learning to enhance analysis in spoofing detection. In some embodiments, the techniques can include one or more devices sending a computer program to a client device. For example, the one or more devices can send a computer program and web content to a client device requesting the web content. The client device can have an Internet Protocol address (IP address), and the computer program can be executed on and/or by the client device after it is received by the client device. The computer program can measure round-trip times for messages the computer program sends to multiple pre-selected location servers at different remote or distant locations and for corresponding reply messages that are returned to the computer program. The one or more devices can receive, from the computer program, the IP address of the client device and the measured round-trip times. And, then, the one or more computing devices can determine whether the measured round-trip times are anomalous or within one or more expected ranges of time for the multiple pre-selected location servers and for known client devices having a predetermined range of IP addresses including the IP address of the client device. To put it another way, the one or more computing devices can detect possible spoofing according to the measured RTTs. Also, the one or more computing devices can perform a security action in response to determining the measured round-trip times are anomalous, since such a determination can be an indicator of possible spoofing. The security action can include blocking access, by the client device, to web content (or online products or services) and/or providing a multiple-factor authentication process to the client device.

In some embodiments, the computer program can send multiple messages to each pre-selected location server in the measuring of the round-trip times.

In some embodiments, the one or more computing devices can determine the one or more expected ranges of time based on a model of round-trip times for the multiple preselected location servers and for known client devices having a predetermined range of IP addresses including the IP address of the client device. In such embodiments, the one or more computing devices can determine the one or more expected ranges of time based on machine learning that uses the round-trip times for the multiple preselected location servers and for the known client devices as input for the machine learning. The machine learning can include the use of random forests.

In some embodiments, the one or more computing devices can, for each pre-selected location server, determine an average round-trip time for the pre-selected location server according to the measured round-trip times for the pre-selected location server. In such embodiments, the one or more computing devices can determine whether one of the average round-trip times is anomalous or within the one or more expected ranges of time, and can perform the security action in response to determining that at least one of the average round-trip times is anomalous. Also, in such embodiment, the computing device(s) can determine the one or more expected ranges of time based on a model of average round-trip times for the multiple preselected location servers and for client devices having a predetermined range of IP addresses including the IP address of the client device. Also, the computing device(s) can determine the one or more expected ranges of time based on machine learning that uses the average round-trip times for the multiple preselected location servers and for the known client devices as input for the machine learning. Also, the computing device(s) can determine the average round-trip times are anomalous when at least one of the average round-trip times exceeds a respective threshold for the corresponding pre-selected location server. The computing device(s) also can determine the respective threshold for the corresponding pre-selected location server using machine learning and the average round-trip time for the corresponding pre-selected location server and for the known client devices as input for the machine learning.

In some embodiments, the one or more computing devices can perform a security action in response to not receiving the measured round trip from the computer program within a predetermined time period.

In some embodiments, the one or more computing devices can block access to additional web content by the client device in response to determining the measured round-trip times are anomalous. Alternatively, the one or more computing device can execute a multiple-factor authentication process in response to determining the measured round-trip times are anomalous.

In some embodiments, the computer program, received by the client device, can measure the round-trip times by pinging the multiple pre-selected location servers, and each pre-selected location server can be pinged by the computer program multiple times.

In some embodiments, the measuring of round-trip times, for each pre-selected location server, can occur at least three times for the pre-selected location server. And, the pre-selected location servers can include at least three pre-selected location servers. Using at least three pre-selected location servers can increase the confidence that spoofing is detected when it is determined the round-trip times are anomalous.

Some of the technologies described herein include a computer system. The computer system can implement the features and operations of the aforesaid methods and the aforesaid medium. The medium can specifically be implemented by memory of the system. The computer system can also include the processing device.

BRIEF DESCRIPTION OF THE DRAWINGS

The present disclosure will be understood more fully from the detailed description given below and from the accompanying drawings of various embodiments of the disclosure.

FIGS. 2, 3, and 4, are each flow diagrams of example methods for implementing location spoofing detection using round-trip times, in accordance with some embodiments of the present disclosure.

DETAILED DESCRIPTION

Figure 1:
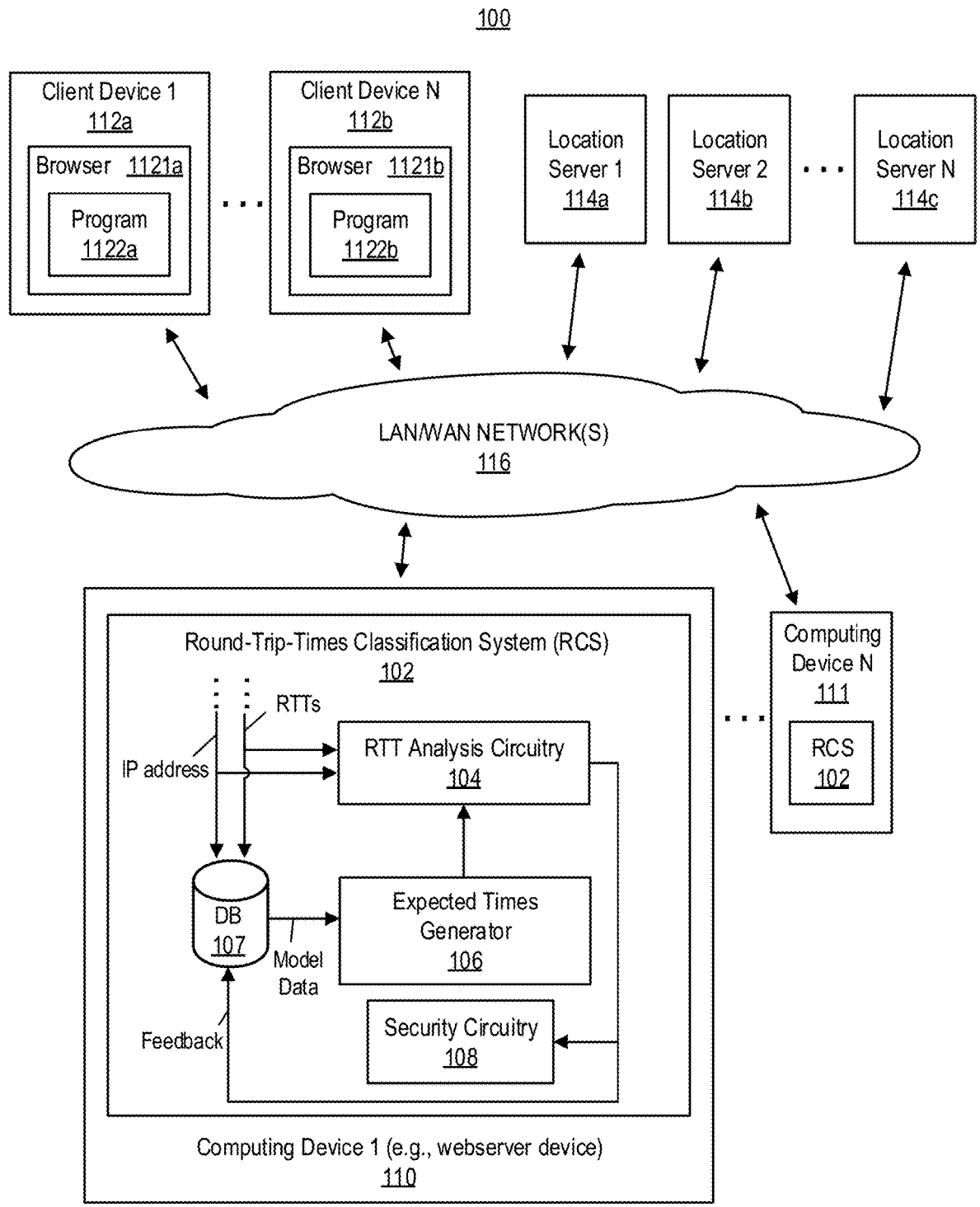
FIG. 1 illustrates an example network of computer systems to implement technologies for location spoofing detection using round-trip times (RTTs), in accordance with some embodiments of the present disclosure.

The disclosed techniques herein include systems and methods for implementing location spoofing detection using round-trip times (RTTs). The disclosed techniques provide specific technical solutions to at least the technical problems mentioned in the background section and other parts of the application as well as other technical problems not described herein but recognized by those of skill in the art. The disclosed techniques herein can utilize at least one round-trip time from a back-and-forth communication with a distant server to detect spoofing in a computer network, such as IP spoofing. Also, the techniques can use machine learning to enhance analysis in spoofing detection.

The disclosed techniques can solve the example problems in detecting user impersonation by means of network tunneling (such as tunneling through virtual private networks (VPNs), anonymity networks, and proxies). Web services often use Internet Protocol (IP) addresses and such services can determine geo-location to fingerprint a user (such as a known user). Threat actors or other types of attackers can obtain a similar IP of a legitimate or known user to reduce the chance of detection. However, those attackers might be physically far away from the legitimate user's geolocation. The techniques can distinguish between attackers (who are often not in the geolocation they claim to be in according to their IP address) and legitimate users (who are not attempting to spoof their location and are in the geolocation they claim to be in according to their IP address).

Known techniques to detect user impersonation in web applications involve device and browser fingerprinting (e.g., checking fonts installed in browser, browser headings, etc.). Many commercial services that provide network or VPN identification use blacklists of IP addresses of known VPN providers. However, there are no known generic ways to detect IP addresses generated by VPNs or other ways of spoofing geolocation and IP addresses. The disclosed techniques can solve such problems through using round-trip times (RTTs).

Some researchers have studied the idea of round-trip time (RTT) based network triangulation to geolocate hosts for security purposes. However, such researchers typically assume that the RTT calculation is performed outside the to-be-located device, which has the inherent limitation that the potentially malicious host is using tunneling to fake its IP address. The disclosed techniques can solve such problems through measuring RTTs from the potentially malicious host itself. Moreover, the potentially malicious host may refuse to execute ping queries for its RTTs to be measured; but, the disclosed techniques can resolve such a problem as well. There is an advantage to running a program located in the to-be located client, and this advantage is leveraged by the techniques disclosed herein. And, when a host client device of the pining computer program does not report its RTTs, then the systems disclosed herein can determine that the client device is suspicious or abnormal. And, thus, act accordingly.

The systems and methods disclosed herein can use a computer program that can run on the browser of a client device (such as a JavaScript) to execute the pings in RTT measurements. Thus, the computer program can run on the device of an attacker or impersonator via a browser of the device. This leverages examples where the attacker uses his or her own machine to perform an impersonation attack (e.g., as in session hijacking attacks where users can steal a victim's username and password or session cookies).

Such scenarios and others like them, can be avoided using the disclosed techniques. For example, from a JavaScript downloaded on a client device of an attacker, the JavaScript can measure one or more RTTs to each of three servers that are geographically far apart from each other (e.g., a location server on the east coast of the United States, one on the west coast of the U.S., and one near the center of the U.S.). Another computer program remote from the client device (such as on a server) can then build a profile of typical RTTs to client devices for a given IP address range that includes the IP address of the client device being measured. The building of the profile can use a machine learning approach, such as an approach using random forests, to detect anomalies in a user RTT profile.

One example problem is that RTTs can be skewed by many different external factors. However, the methods and systems described herein can overcome such a problem by collecting a sufficient amount of RTTs for an IP address or range of IP addresses. For example, the techniques can use machine learning to analyze how RTTs are affected by random factors such as network quality and time of the day. Such an analysis can produce or adjust a RTT profile for a client device so that it is relatively stable and predictable. An impersonator or attacker will usually have a very different RTT profile (for example, an attacker will usually not have a stable or predictable profile and it will usually fall outside of an expected range of RTTs).

Differences between RTT profiles of legitimate users and many impersonating users occur because RTT can depend on geographical distance from a client device to a location server. In general, network communication speeds can be physically limited by geographical distance. RTTs will be different between different geographical distances with enough sampling. This occurs especially when the differences in distances are great (such as 100 miles away, 500 miles away, 1000 miles away, 5000 miles away, etc.). Specifically, communications between a client device and a server device are inherently limited by the speed at which packets can travel over wide-area computer networks.

Figure 6:
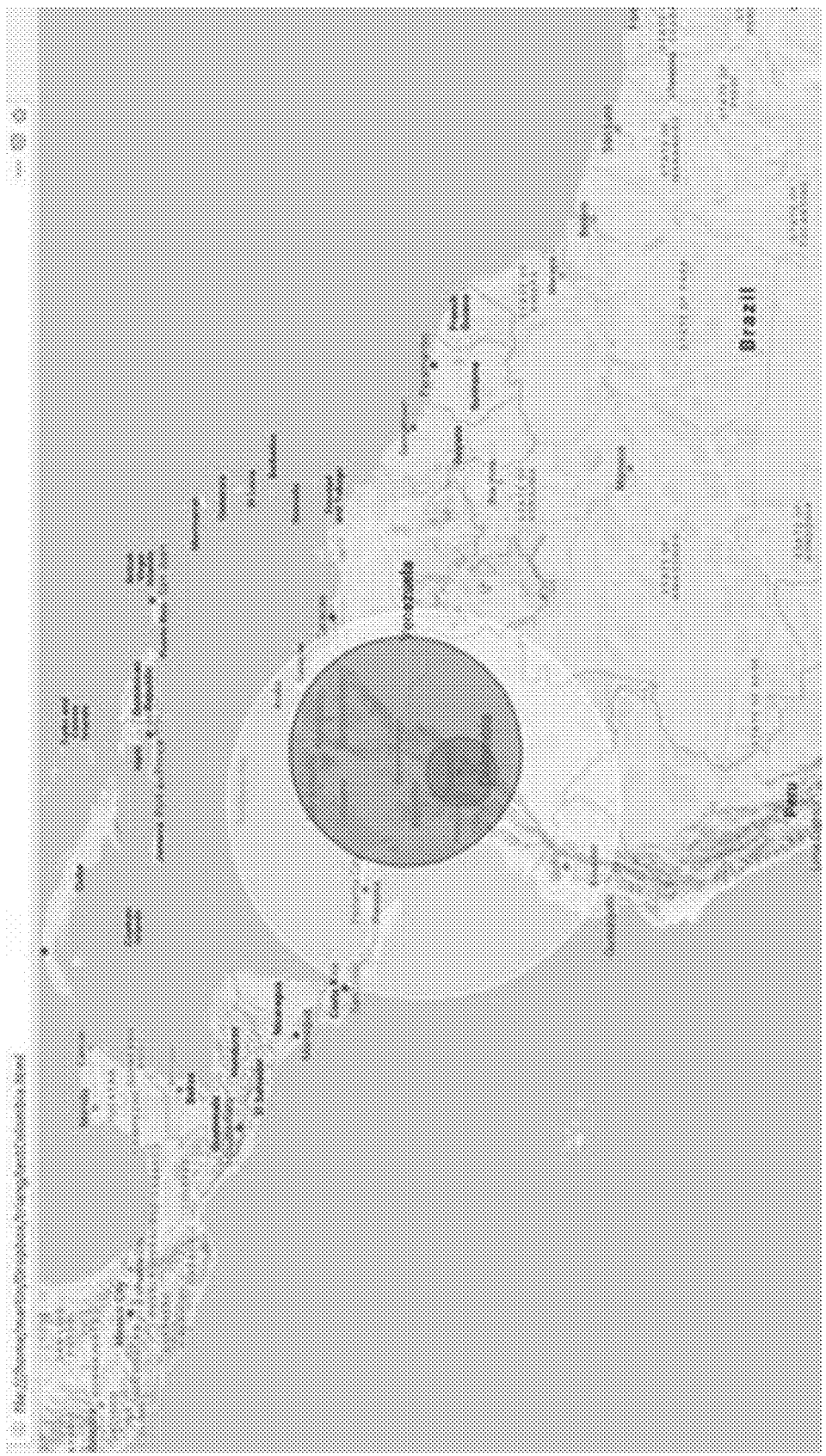
FIGS. 6 and 7 depict images of example distance estimations based on RTTs.
Figure 7:
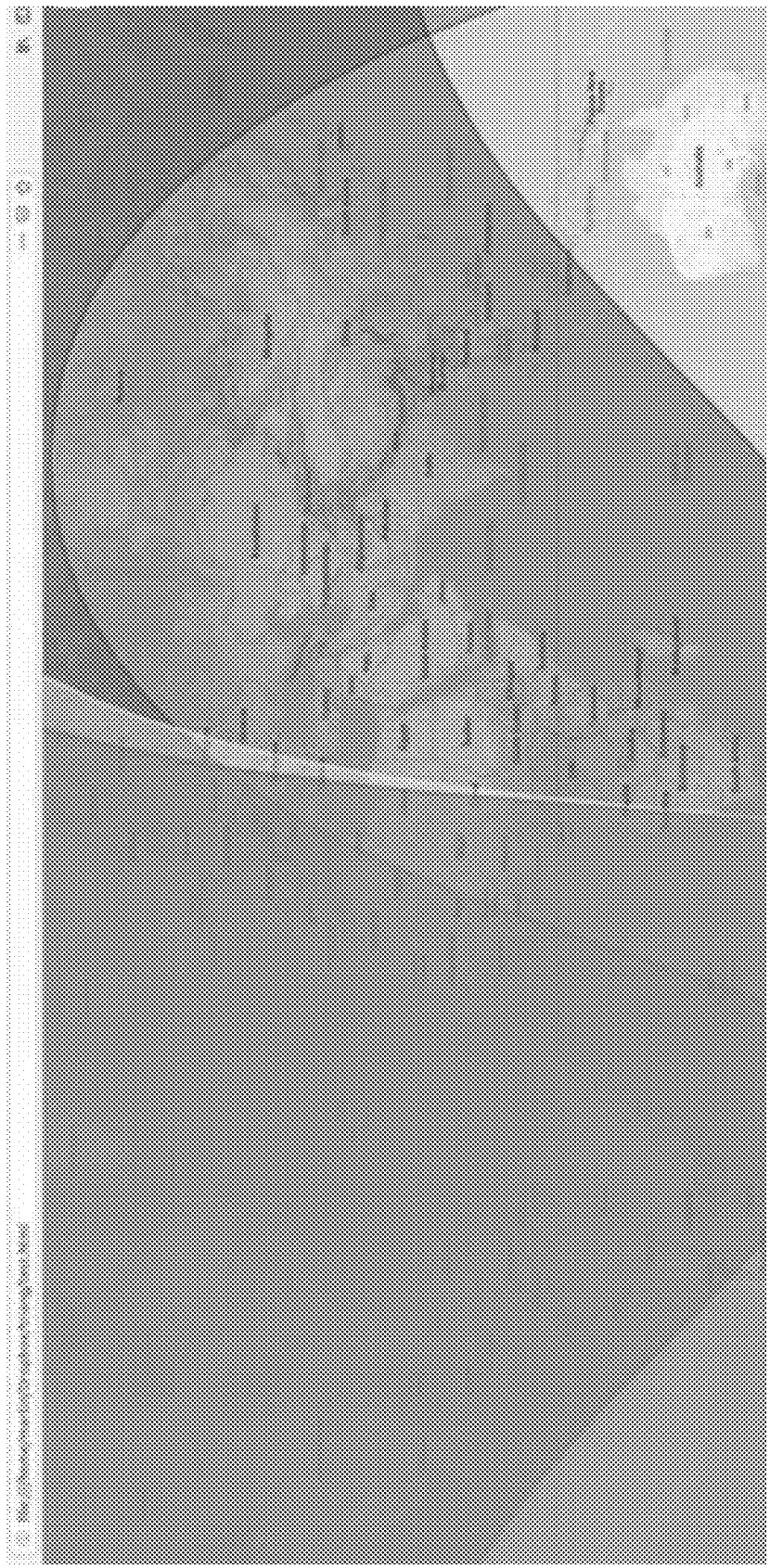

As an example, consider the triangulation of a user that claims to be in Bogota, Colombia and truly is in Bogota. Such a user will have RTTs or an RTT profile that is relatively stable and expected. For example, see FIG. 6 which depicts stable RTTs. FIG. 6 shows circles drawn on a map based on a distance estimation from RTTs of a client to three servers located in Bogota, Bucaramanga and Medellin. The overlapping circles show that the client is nearby to Bogota (which is the approximate location the device claims in its IP address). On the other hand, FIG. 7 depicts graphics (or circles) on a map when the user is most likely an attacker or impersonator using a VPN to mimic a legitimate IP address for a claimed location. Specifically, in FIG. 7, the overlapping estimated circles to the client device is with respect to respective servers in Menlo Park (US), Geneva (CH), Bogota (CO) and Sao Paulo (BR). Different from FIG. 6, there is no common overlapping region, since RTT times are distorted by tunneling or another impersonation technique. Thus, in the graphic in FIG. 7, the system cannot locate the client device, and the client device is recognized as executing anomalous behavior.

In some embodiments, the techniques can determine whether or not RTTs of a client device are anomalous or within an expected range. Also, using triangulation the techniques can estimate the location of a legitimate user that is not using tunneling.

In some embodiments, a computer program on a client device (such as a JavaScript in a client's browser) can ping at least two servers (e.g., three location servers). The computer program can be downloaded via a browser running on the client device. Each server can be pinged a number of times (e.g., each server is pinged three times). Then, the computer program or another program or system can average of the RTTs with respect to each server. The output can be a set of average RTTs, one average RTT per location server (e.g., t1, t2 and t3 for three different location servers). In such embodiments and others, a model of usual RTT vectors for a given client and a given IP can be built and stored in a classification server. The server can then make a decision on whether a given session has a normal or an anomalous behavior with respect to the RTT vector. The classification can be used together with other context characteristics (such as browser and OS type) to decide whether the overall session is to be considered suspicious. The RTTs can be used in several ways, including attempting triangulation if enough servers close to the claimed location are available.

In general, the techniques described herein can detect location spoofing attacks, given that attackers are physically far away from the pretended location (such as in another country). The techniques can also have a low false positive rate, since the model is tolerant to network delays, such as network delays at a first link (e.g., user-ISP link). Also, the cost of implementing the techniques disclosed herein can be low since only two or three remote or distant location servers are sufficient for measuring the RTTs. And, the techniques do not interfere with user experience since the RTT measurements can be done efficiently and out of the view of the user.

As opposed to IP address blacklisting, the techniques disclosed herein can detect attacks that use unknown IPs or that use legitimate IPs (such as proxy attacks using a victim's machine or legitimate IPs generated through tunneling). Also, as opposed to device fingerprinting, the techniques disclosed herein can detect IP address spoofing attacks and device impersonations.

FIG. 1 illustrates an example network of computer systems 100 to implement technologies for location spoofing detection using round-trip times (RTTs), in accordance with some embodiments of the present disclosure. The example network of computer systems 100 can implement any of the aforesaid components and operations as well as any component or operation described herein.

The network of computer systems 100 is shown including a round-trip-times classification system (or RCS 102). The RCS 102 is shown including round-trip-time analysis circuitry 104, an expected times generator 106, a database 107, and security circuitry 108. As shown in FIG. 1, RCS 102 can be hosted on one more computers (e.g., see computing devices 110 and 111). It is shown that the round-trip-time analysis circuitry 104 (or RTT analysis circuitry 104) provides output data to the security circuitry 108 and the database 107, in which the circuitry 108 and the database 107 use as input. Also, it is shown that the expected times generator 106 provides output data to the RTT analysis circuitry 104, which the circuitry 104 uses as inputs. The round-trip-time analysis circuitry 104 is shown receiving input data from multiple sources (e.g., database 107 as well as additional sources such as from client devices 112*a* and 112*b*). As shown, the input data from the client devices includes IP addresses (such as IP addresses of the client devices 112*a* and 112*b*) and RTTs measured by computer programs running on the client devices (e.g., see programs 1122*a* and 1122*b* executed on browsers 1121*a* and 1121*b* executed on the client devices, respectively). Also, as shown, feedback from the round-trip-time analysis circuitry 104 can be provided to the database 107 that feeds the expected times generator 106. For example, FIG. 1 shows the RTT analysis circuitry 104 providing feedback to database 107. The feedback can be the output of RTT analysis circuitry 104, a derivative of the output, or intermediate data within a calculation of the RTT analysis circuitry.

The network of computer systems 100 is also shown including client devices that can receive data from RCS 102 as well as communicate data to RCS 102 (e.g., see client devices 112*a* and 112*b*). Client devices, which are communicatively coupled with the RCS 102 via one or more LAN/WAN networks 116, can transmit normal, anomalous, and/or spoofed communications to the devices having the RCS 102 through the network(s) 116.

The network of computer systems 100 is also shown including locations servers that are each configured to at least reply to RTT inquiries (e.g., see location servers 114*a*, 114*b*, and 114*c*). The RTT inquiries can be sent from the computer programs running on the client devices (e.g., see computer programs 1122*a* and 1122*b*). The computer programs can be sent to the client devices when the client devices request products, services, or content from the RCS 102 or computing devices and/or systems connected to the RCS 102 that provide products, services, or content.

The network of computer systems 100 is also shown including the LAN/WAN network(s) 116 which are shown communicatively coupling the computing devices hosting RCS 102 and the client devices. The LAN/WAN network(s) 116 can include one or more local area networks (LAN(s)) and/or one or more wide area networks (WAN(s)). The LAN/WAN network(s) 116 can include the Internet and/or any other type of interconnected communications network. The LAN/WAN network(s) 116 can also include a single computer network or a telecommunications network. More specifically, the LAN/WAN network(s) 116 can include a local area network (LAN) such as a private computer network that connects computers in small physical areas, a wide area network (WAN) to connect computers located in different geographical locations, and/or a metropolitan area network (MAN)—also known as a middle area network—to connect computers in a geographic area larger than that covered by a large LAN but smaller than the area covered by a WAN.

At least each shown component of the network of computer systems 100 can be or include a computer system which can include memory that can include media. The media can include or be volatile memory components, non-volatile memory components, or a combination of such. In some embodiments, the memory is a storage system. An example of a storage system is a SSD. In some embodiments, the memory is a hybrid memory/storage sub-system. In general, each of the computer systems can include a host system that uses the memory. For example, the host system can write data to the memory and read data from the memory.

The host system can be a computing device such as a desktop computer, laptop computer, network server, mobile device, or such computing device that includes a memory and a processing device. The host system can include or be coupled to the memory so that the host system can read data from or write data to the memory. The host system can be coupled to the memory via a physical host interface. The physical host interface can provide an interface for passing control, address, data, and other signals between the memory and the host system.

A memory system controller (hereinafter referred to as "controller") can communicate with the memory components to perform operations such as reading data, writing data, or erasing data at the memory components and other such operations. The controller can include hardware such as one or more integrated circuits and/or discrete components, a buffer memory, or a combination thereof. The controller can be a microcontroller, special purpose logic circuitry (e.g., a field programmable gate array (FPGA), an application specific integrated circuit (ASIC), etc.), or other suitable processors. The controller can include a processor (processing device) configured to execute instructions stored in local memory. The local memory of the controller can include an embedded memory configured to store instructions for performing various processes, operations, logic flows, and routines that control operation of the memory, including handling communications between the memory and the host system. In general, the controller can receive commands or operations from the host system and can convert the commands or operations into instructions or appropriate commands to achieve the predetermined desired access to the memory components.

The memory can also include additional circuitry or components. In some embodiments, the memory can include a cache or buffer (e.g., DRAM) and address circuitry (e.g., a row decoder and a column decoder) that can receive an address from the controller and decode the address to access the memory components.

In some aspects of the present disclosure, the memory includes the RCS 102. In some embodiments, the controller includes at least a portion of the RCS 102. For example, the controller can include a processor (processing device) configured to execute instructions stored in local memory for performing the operations described herein such as the operations described herein associated with the RCS 102. In some embodiments, the RCS 102 is part of the host system, an application, or an operating system.

The RCS 102 can use the memory, the memory components, and the host system to implement technologies for performing location spoofing detection using round-trip times (RTTs).

Further details with regards to the operations of the RCS 102 are described below. As shown in FIG. 1, the network of computer systems 100 can include the RCS 102.

In some embodiments, the technologies disclosed herein can include a system including multiple location servers (e.g., three location servers such as the locations servers 114a, 114b, and 114c depicted in FIG. 1), a computer program (e.g., computer program 1122a or 1122b), and a classification server (e.g., a classification server executed on one or more computing devices such as one or more of computing devices 110 and 111). The multiple location servers can each be located at different geographically remote or distant locations from each other.

The computer program can be configured to execute on a client device (e.g., client device 112a or 112b) after it is received by the client device. The computer program can be configured to ping the multiple location servers to measure round-trip times for messages sent from the computer program to the multiple location servers that are echoed back to the computer program. And, the computer program can be configured to communicate an IP address of the client device and the measured round-trip times to a classification server (e.g., a classification server executed on one or more computing devices such as one or more of computing devices 110 and 111).

The classification server (e.g., a classification server executed on one or more computing devices such as one or more of computing devices 110 and 111) can be configured to receive, from the computer program, the IP address of the client device and the measured round-trip times. And, classification server can be configured to determine whether the measured round-trip times are anomalous or within one or more expected ranges of time for the multiple location servers and for known client devices having a predetermined range of IP addresses including the IP address of the client device. Also, the classification server can be configured to perform a security action in response to the classification server determining the measured round-trip times are anomalous.

In some embodiments, the computer program (e.g., computer program 1122a or 1122b) can send multiple messages to each pre-selected location server (e.g., location servers 114a, 114b, and 114c) in the measuring of the round-trip times.

In some embodiments, the one or more computing devices (e.g., one or more of computing devices 110 and 111) can determine the one or more expected ranges of time based on a model of round-trip times for the multiple preselected location servers and for known client devices having a predetermined range of IP addresses including the IP address of the client device. In such embodiments, the one or more computing devices can determine the one or more expected ranges of time based on machine learning that uses the round-trip times for the multiple preselected location servers and for the known client devices as input for the machine learning. The machine learning can include the use of random forests.

In some embodiments, the one or more computing devices (e.g., one or more of computing devices 110 and 111) can, for each pre-selected location server, determine an average round-trip time for the pre-selected location server according to the measured round-trip times for the pre-selected location server. In such embodiments, the one or more computing devices can determine whether one of the average round-trip times is anomalous or within the one or more expected ranges of time, and can perform the security action in response to determining that at least one of the average round-trip times is anomalous. Also, in such embodiment, the computing device(s) can determine the one or more expected ranges of time based on a model of average round-trip times for the multiple preselected location servers and for client devices having a predetermined range of IP addresses including the IP address of the client device. Also, the computing device(s) can determine the one or more expected ranges of time based on machine learning that uses the average round-trip times for the multiple preselected location servers and for the known client devices as input for the machine learning. Also, the computing device(s) can determine the average round-trip times are anomalous when at least one of the average round-trip times exceeds a respective threshold for the corresponding pre-selected location server. The computing device(s) also can determine the respective threshold for the corresponding pre-selected location server using machine learning and the average round-trip time for the corresponding pre-selected location server and for the known client devices as input for the machine learning.

In some embodiments, the one or more computing devices (e.g., one or more of computing devices 110 and 111) can perform a security action in response to not receiving the measured round trip from the computer program within a predetermined time period.

In some embodiments, the one or more computing devices (e.g., one or more of computing devices 110 and 111) can block access to additional web content by the client device in response to determining the measured round-trip times are anomalous. Alternatively, the one or more computing device can execute a multiple-factor authentication process in response to determining the measured round-trip times are anomalous.

In some embodiments, the computer program (e.g., computer program 1122a or 1122b), received by the client device (e.g., client device 112a or 112b), can measure the round-trip times by pinging the multiple pre-selected location servers (e.g., location servers 114a, 114b, and 114c), and each pre-selected location server can be pinged by the computer program multiple times.

In some embodiments, the measuring of round-trip times, for each pre-selected location server, can occur at least three times for the pre-selected location server. And, the pre-selected location servers can include at least three pre-selected location servers (e.g., see location servers 114a, 114b, and 114c). Using at least three pre-selected location servers can increase the confidence that spoofing is detected when it is determined the round-trip times are anomalous.

In some embodiments, a computer program on a client device (such as a JavaScript in a client's browser) can ping at least two servers (e.g., three location servers). The computer program can be downloaded via a browser running on the client device. Each server can be pinged a number of times (e.g., each server is pinged three times). Then, the computer program or another program or system can average of the RTTs with respect to each server. The output can be a set of average RTTs, one average RTT per location server (e.g., t1, t2 and t3 for three different location servers). In such embodiments and others, a model of usual RTT vectors for a given client and a given IP can be built and stored in a classification server. The server can then make a decision on whether a given session has a normal or an anomalous behavior with respect to the RTT vector. The classification can be used together with other context characteristics (such as browser and OS type etc.) to decide whether the overall session is to be considered suspicious. The RTTs can be used in several ways, including attempting triangulation if enough servers close to the claimed location are available.

Figure 3:
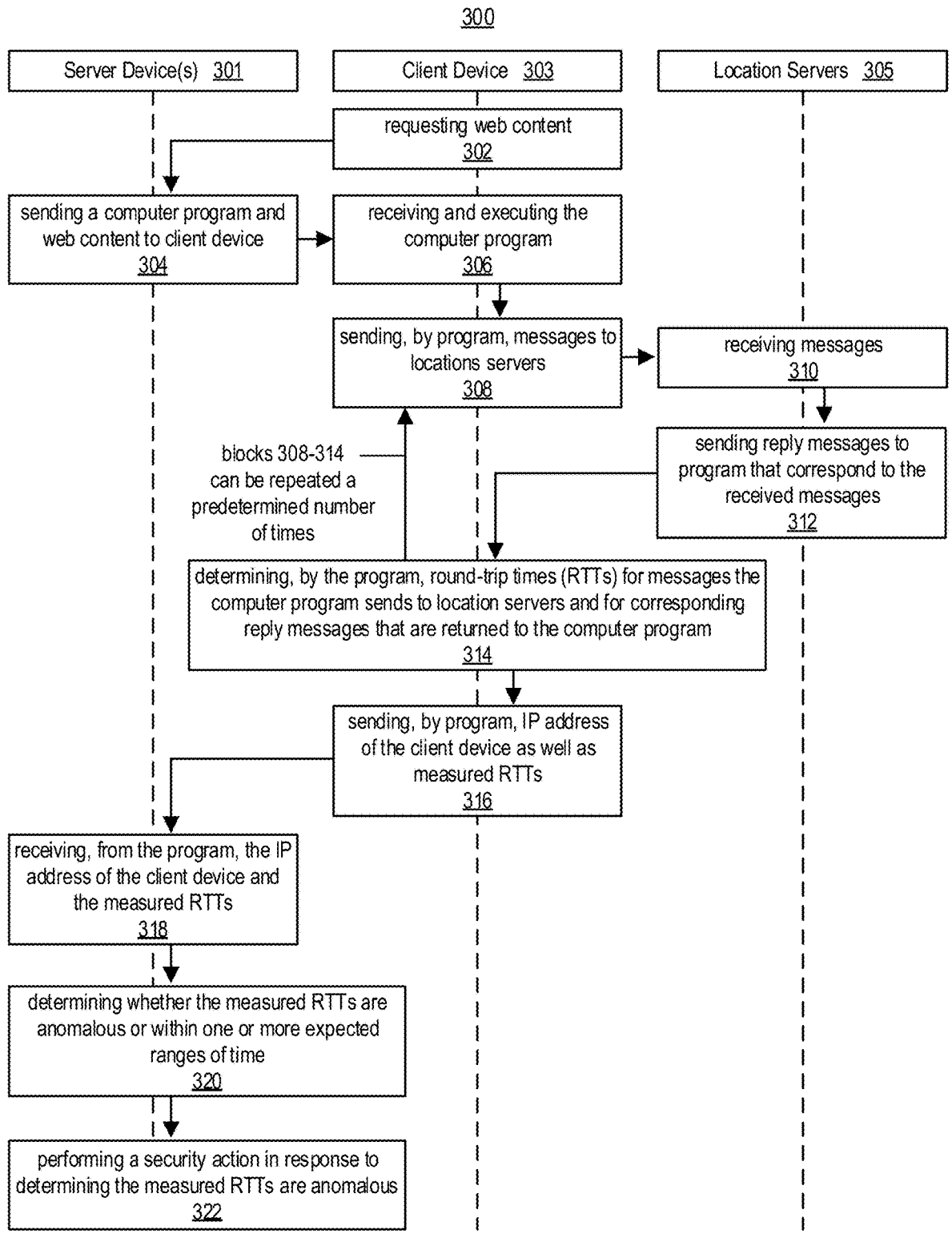
Figure 4:
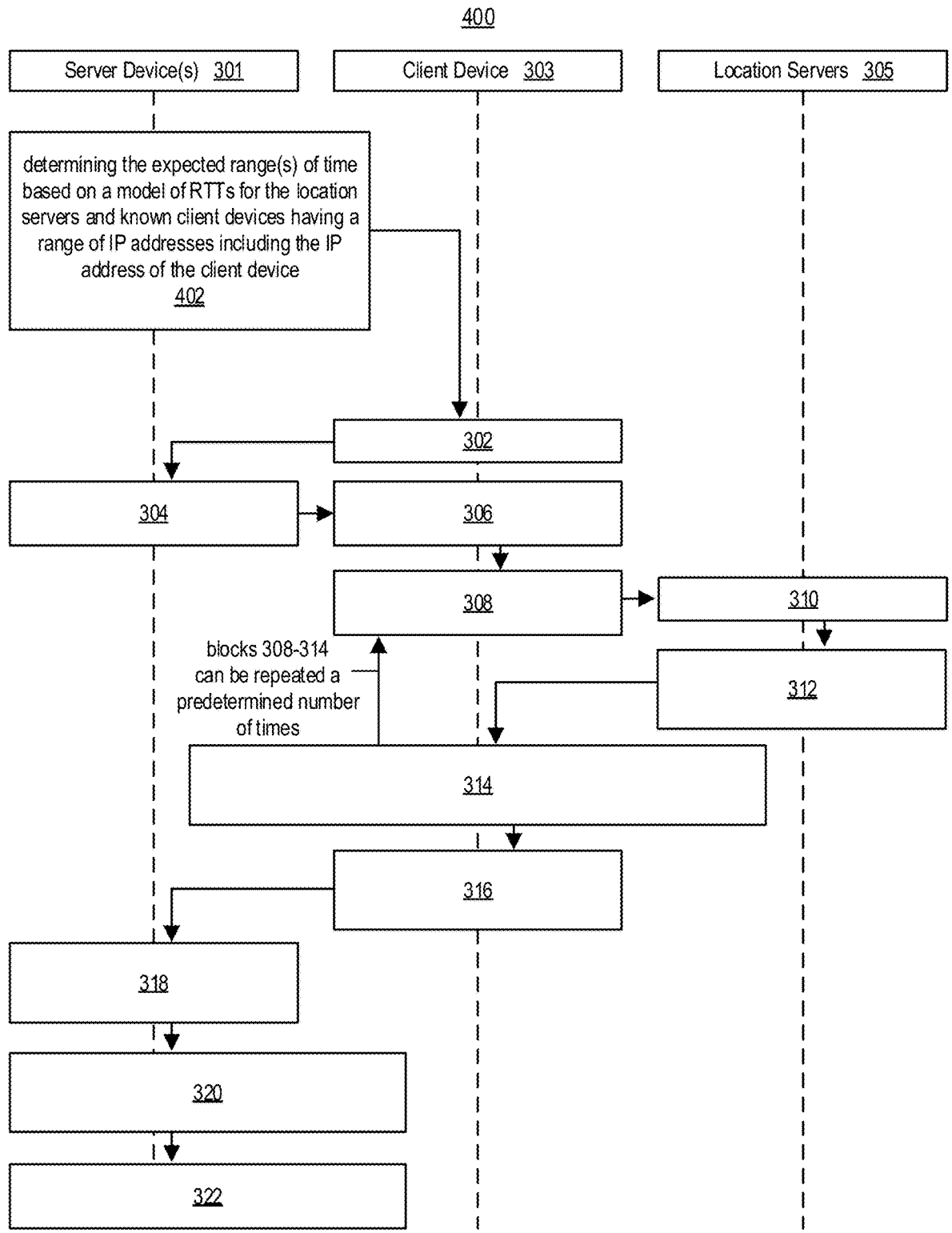

FIGS. 2, 3, and 4 are flow diagrams of example methods that can be implemented by parts of the network of computer systems 100, in accordance with some embodiments of the present disclosure. The respective methods 200, 300, and 400 in FIGS. 2, 3, and 4 can each be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the methods can be performed by one or more aspects of the RCS 102. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

FIG. 2 is a flow diagram of an example method 200 for implementing location spoofing detection using round-trip times (RTTs), in accordance with some embodiments of the present disclosure.

At block 202, the method 200 includes determining, by one or more computing devices, one or more expected ranges of time based on a model of round-trip times for the location servers mentioned in reference to block 204 and for known client devices having a predetermined range of IP addresses including the IP address of the client device mentioned in block 204. In some embodiments, the determining in block 202 can be performed by the expected times generator 106.

In some embodiments, the one or more computing devices can determine the one or more expected ranges of time based on a model of round-trip times for the multiple preselected location servers and for known client devices having a predetermined range of IP addresses including the IP address of the client device. In such embodiments, the one or more computing devices can determine the one or more expected ranges of time based on machine learning that uses the round-trip times for the multiple preselected location servers and for the known client devices as input for the machine learning. The machine learning can include the use of random forests.

In some embodiments, the one or more computing devices can, for each pre-selected location server, determine an average round-trip time for the pre-selected location server according to the measured round-trip times for the pre-selected location server. In such embodiments, the one or more computing devices can determine whether one of the average round-trip times is anomalous or within the one or more expected ranges of time, and can perform the security action in response to determining that at least one of the average round-trip times is anomalous. Also, in such embodiment, the computing device(s) can determine the one or more expected ranges of time based on a model of average round-trip times for the multiple preselected location servers and for client devices having a predetermined range of IP addresses including the IP address of the client device. Also, the computing device(s) can determine the one or more expected ranges of time based on machine learning that uses the average round-trip times for the multiple preselected location servers and for the known client devices as input for the machine learning. Also, the computing device(s) can determine the average round-trip times are anomalous when at least one of the average round-trip times exceeds a respective threshold for the corresponding preselected location server. The computing device(s) also can determine the respective threshold for the corresponding pre-selected location server using machine learning and the average round-trip time for the corresponding pre-selected location server and for the known client devices as input for the machine learning.

At block 204, the method 200 continues with sending, by the one or more computing devices, a computer program and web content to a client device. In some embodiments, the one or more computing devices can send the computer program without the web content. And, the one or more computing devices can send the computer program with any type of product, service, or content via a computer network such as the Internet. In the method, the client device has an IP address. Also, the computer program executes on the client device after it is received by the client device. And, the program measures round-trip times for messages the program sends to location servers at different remote or distant locations and for corresponding reply messages that are returned to the computer program. In some embodiments, the sending in block 204 can be performed by the RCS 102.

In some embodiments, the computer program can send multiple messages to each pre-selected location server in the measuring of the round-trip times.

In some embodiments, the measuring of round-trip times, for each pre-selected location server, can occur at least three times for the pre-selected location server. And, the pre-selected location servers can include at least three pre-selected location servers. Using at least three pre-selected location servers can increase the confidence that spoofing is detected when it is determined the round-trip times are anomalous.

In some embodiments, the computer program, received by the client device, can measure the round-trip times by pinging the multiple pre-selected location servers. And, in some embodiments, each pre-selected location server can be pinged by the computer program multiple times.

At block 206, the method 200 continues with receiving by the one or more computing devices, from the computer program, the IP address of the client device and the measured RTTs. As shown in the figure, if the IP address of the client device and the measured RTTs are not received, then the method 200 continues with performing, by the one or more computing devices, a security action in response to not receiving the measured round-trip times from the computer program (at block 214). The performance of the security action can occur with the measured round-trip times are not received by the computing device(s) within a predetermined time period. In some embodiments, the receiving in block 206 can be performed by the RCS 102 and/or the RTT analysis circuitry 104. And, in some embodiments, the performance of the security action in blocks 210 and 214 can be performed by the security circuitry 108.

If the IP address of the client device and the measured RTTs are received by the computing device(s) (at block 204), then the method 200 continues with determining, by the one or more computing devices, whether the measured round-trip times are anomalous or within one or more expected ranges of time for the multiple pre-selected location servers and for known client devices having a predetermined range of IP addresses including the IP address of the client device (at block 208). In some embodiments, the determining in block 208 can be performed by the RTT analysis circuitry 104.

At block 210, the method 200 continues with performing, by the one or more computing devices, a security action in response to determining the measured round-trip times are anomalous. And, in some embodiments, the performance of the security action in blocks 210 and 214 can be performed by the security circuitry 108.

In some embodiments, the one or more computing devices can block access to additional web content by the client device in response to determining the measured round-trip times are anomalous. Alternatively, the one or more computing device can execute a multiple-factor authentication process in response to determining the measured round-trip times are anomalous. For example, the one or more computing device can execute a two-factor or three-factor authentication process in response to determining the measured round-trip times are anomalous.

At block 212, the method 200 continues with providing, by the one or more computing devices, web content without performing the security action, in response to determining the measured round-trip times are within the one or more expected ranges of time. And, in some embodiments, any type of product, service, or content can be provided via a computer network such as the Internet.

FIG. 3 is a flow diagram of an example method 300 for implementing location spoofing detection using round-trip times (RTTs), in accordance with some embodiments of the present disclosure. As shown, the operations of blocks 304, 318, 320, and 322 are performed by one or more server computing devices 301. Also, as shown, the operations of blocks 302, 306, 308, 314, and 316 are performed by client device 303. And, as shown, the operations of blocks 310 and 312 are performed by two or more location servers 305. In some embodiments, the location servers 305 are geographically distant from the server computing device(s) 301 and/or the client device 303. In some examples, the location servers 305 must be at least 100, 200, 300, 400, 500, 600, 700, 800, or 900 miles from the server computing device(s) 301 and/or the client device 303. In some examples, the location servers 305 must be at least 1000, 2000, 3000, 4000, 5000, 6000, 7000, 8000, 9000, or 10000 miles from the server computing device(s) 301 and/or the client device 303.

Method 300 begins at block 302 with the client device 303 requesting web content (or requesting an online product or service) from server device(s) 301. At block 304, the server device(s) 301 send a computer program and the requested web content (or the requested online product or service) to the client device 303 (which is the requesting client device).

At block 306, the client device 303 receives the computer program along with other data from the server device(s) 301. Sometimes, the client device 303 only receives the computer program from the server device(s) 301. At block 306, the client device 303 also executes the computer program.

At block 308, the client device 303 sends, by and/or through the computer program, messages to the location servers 305. Block 308 commences negotiations between the client device 303 and the location servers 305. The negotiation can include the client device pinging each one of the location servers one or more times to measure RTTs for communications round trips between the client device and each one of the location servers. The negotiation continues at block 308 with the client device 303 sending, by and/or through the computer program, messages to location servers 305. At block 310, the location servers 305 receive the messages. At block 312, the location servers 305, in response to receiving the messages from the client device 303, send reply messages to the computer program. The reply messages each correspond to respective received messages.

At block 314, the client device 303 receives the reply messages and determines, via the computer program, RTTs for messages the computer program sends to the location servers and for corresponding reply messages that are returned to the computer program from the location servers. For example, at block 314, the client device 303 determines RTTs from the client device pinging the location servers 305. The blocks 308-314 can be repeated a predetermined number of times. With an increased number of times for repeating blocks 308-314, the server device(s) 301 can become more confident in determining whether the measured RTTs are anomalous or within one or more expected ranges of time.

After the negotiations, at block 316, the client device 303 sends, by and/or through the computer program, the IP address of the client device 303 as well as the measured round-trip times. At block 318, the server device(s) 301 receive, from the computer program, the IP address of the client device and the measured RTTs. At block 320, the server device(s) 301 determine whether the measured RTTs are anomalous or within one or more predetermined expected ranges of time. At block 322, the server device(s) 301 perform a security action in response to determining the measured RTTs are anomalous.

The operation at block 204 in FIG. 2 can include the operations at block 302 and/or block 304. The operation at block 204 can include the negotiations illustrated by blocks 308-314 and/or the operations at blocks 306-316. The operation at block 206 can include the operation at block 318. The operation at block 208 can include the operation at block 320. And, the operation at block 210 can include the operations at block 322.

FIG. 4 is a flow diagram of an example method 400 for implementing location spoofing detection using round-trip times (RTTs), in accordance with some embodiments of the present disclosure. Method 400 includes all the operations of method 300 as well as the operation of block 402. At block 402, the method 400 includes the server device(s) 301 determining the expected range(s) of time based on a model of RTTs for the location servers 305 and known client devices having a range of IP addresses including the IP address of the client device 303. The operation of block 202 depicted in FIG. 2 can include the operation of block 402.

Figure 5:
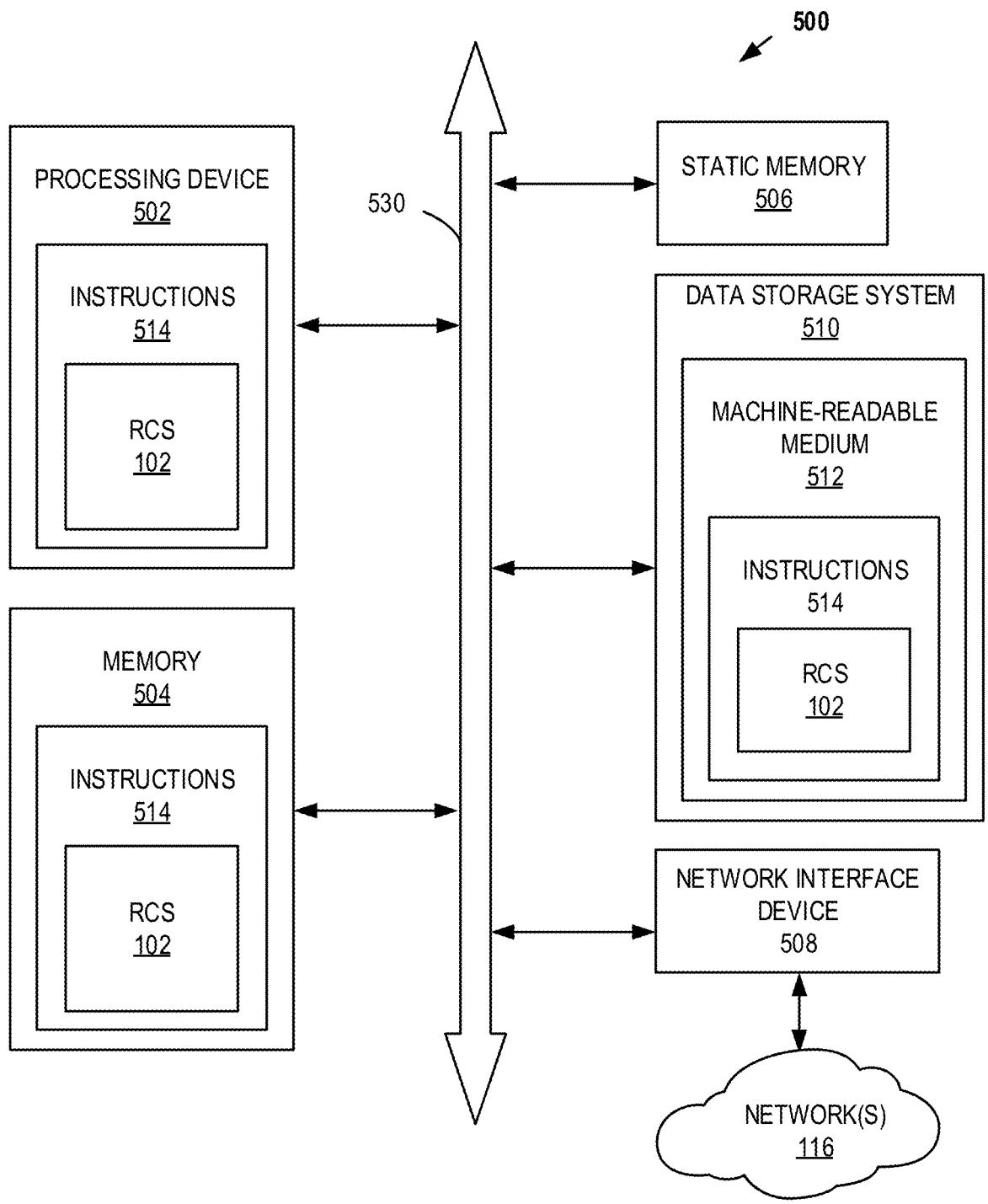
FIG. 5 is a block diagram of example aspects of an example computer system, in accordance with some embodiments of the present disclosure.

FIG. 5 is a block diagram of example aspects of an example computer system 500, in accordance with some embodiments of the present disclosure. FIG. 5 illustrates parts of the computer system 500 within which a set of instructions, for causing the machine to perform any one or more of the methodologies discussed herein, can be executed. In some embodiments, the computer system 500 can correspond to a host system that includes, is coupled to, or utilizes memory or can be used to perform the operations of a controller (e.g., to execute an operating system to perform operations corresponding to the RCS 102). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random-access memory (DRAM), etc.), a static memory 506 (e.g., flash memory, static random-access memory (SRAM), etc.), and a data storage system 510, which communicate with each other via a bus 530.

The processing device 502 represents one or more general-purpose processing devices such as a microprocessor, a central processing unit, or the like. More particularly, the processing device can be a microprocessor or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 514 for performing the operations discussed herein, such as operations associated with the RCS 102. The computer system 500 can further include a network interface device 508 to communicate over the LAN/WAN network(s) 116 of FIG. 1.

The data storage system 510 can include a machine-readable storage medium 512 (also known as a computer-readable medium) on which is stored one or more sets of instructions 514 or software embodying any one or more of the methodologies or functions described herein, such as operations associated with the RCS 102. The instructions 514 can also reside, completely or at least partially, within the main memory 504 and/or within the processing device 502 during execution thereof by the computer system 500, the main memory 504 and the processing device 502 also constituting machine-readable storage media.

In one embodiment, the instructions 514 include instructions to implement functionality corresponding to the RCS 102. While the machine-readable storage medium 512 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

FIGS. 6 and 7 depict images of example distance estimations based on RTTs. Specifically, FIG. 6 illustrates circles automatically drawn on a map by one or more computing devices (e.g., one or more of computing devices 110 and 111 depicted in FIG. 1) based on a distance estimation from the RTT of a client device (e.g., client device 112a or 112b) to three servers located in Bogota, Bucaramanga and Medellin (e.g., location servers 114a, 114b, and 114c). With the overlapping of the circles on the map, the computing device(s) can determine that the client device is near Bogota and that the RTTs are within an expected range and not anomalous. Specifically, FIG. 7 illustrates overlapping estimated circles automatically drawn on a map by one or more computing devices. The circles are drawn with respect to a client device communicating with a location server in Menlo Park (US), a location server in Geneva (CH), and a location server in Bogota (CO) as well as a location server in Sao Paulo (BR). Different from the illustration in FIG. 6, there is no common overlapping region, since RTTs are distorted by tunneling. Thus, the computing device(s) cannot locate the client device and the RTTs are determined as anomalous and not within the expected ranges.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a predetermined desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
    sending, by one or more computing devices, a computer program and web content to a client device,
        wherein the client device has an Internet Protocol address (IP address),
        wherein the computer program executes on the client device after it is received by the client device, and
        wherein the computer program measures round-trip times for messages the computer program sends to multiple pre-selected location servers at different distant locations and for corresponding reply messages that are returned to the computer program;
    receiving by the one or more computing devices, from the computer program, the IP address of the client device and the measured round-trip times;
    determining, by the one or more computing devices, whether the measured round-trip times are anomalous or within one or more expected ranges of time for the multiple pre-selected location servers and for known client devices having a predetermined range of IP addresses including the IP address of the client device;
    performing, by the one or more computing devices, a security action in response to determining the measured round-trip times are anomalous;
    for each pre-selected location server, determining, by the one or more computing devices, an average round-trip time for the pre-selected location server according to the measured round-trip times for the pre-selected location server;

determining, by the one or more computing devices, whether one of the average round-trip times is anomalous or within the one or more expected ranges of time;

performing, by the one or more computing devices, the security action in response to determining that at least one of the average round-trip times is anomalous; and determining the one or more expected ranges of time based on a model of average round-trip times for the multiple preselected location servers and for client devices having a predetermined range of IP addresses comprising the IP address of the client device.

2. The method of claim 1, wherein the computer program sends multiple messages to each pre-selected location server in the measuring of the round-trip times.

3. The method of claim 2, further comprising determining the one or more expected ranges of time based on a model of round-trip times for the multiple preselected location servers and for known client devices having a predetermined range of IP addresses comprising the IP address of the client device.

4. The method of claim 3, further comprising determining the one or more expected ranges of time based on machine learning that uses the round-trip times for the multiple preselected location servers and for the known client devices as input for the machine learning.

5. The method of claim 4, wherein the machine learning comprises use of random forests.

6. The method of claim 1, further comprising determining the one or more expected ranges of time based on machine learning that uses the average round-trip times for the multiple preselected location servers and for the known client devices as input for the machine learning.

7. The method of claim 1, further comprising determining, by the one or more computing devices, the average round-trip times are anomalous when at least one of the average round-trip times exceeds a respective threshold for the corresponding pre-selected location server.

8. The method of claim 7, further comprising determining, by the one or more computing devices, the respective threshold for the corresponding pre-selected location server using machine learning and the average round-trip time for the corresponding pre-selected location server and for the known client devices as input for the machine learning.

9. The method of claim 1, further comprising performing, by the one or more computing devices, the security action in response to not receiving the measured round-trip times from the computer program within a predetermined time period.

10. The method of claim 1, further comprising blocking, by the one or more computing devices, access to additional web content by the client device in response to determining the measured round-trip times are anomalous.

11. The method of claim 10, further comprising blocking, by the one or more computing devices, access to additional web content by the client device in response to not receiving the measured round-trip times from the computer program within a predetermined time period.

12. The method of claim 1, further comprising executing, by the one or more computing devices, a multiple-factor authentication process in response to determining the measured round-trip times are anomalous.

13. The method of claim 1, wherein computer program measures the round-trip times by pinging the multiple pre-selected location servers, and wherein each pre-selected location server is pinged by the computer program multiple times.

14. The method of claim 1, wherein the measuring of round-trip times for each pre-selected location server occurs at least three times for the pre-selected location server.

15. The method of claim 1, wherein the pre-selected location servers comprise at least three pre-selected location servers.

16. A system, comprising:
multiple location servers, each location server located at different distant locations;
a computer program, configured to:
  execute on a client device after it is received by the client device;
  ping the multiple location servers to measure round-trip times for messages sent from the computer program to the multiple location servers that are echoed back to the computer program; and
  communicate an IP address of the client device and the measured round-trip times to a classification server; and
the classification server, configured to:
  receive, from the computer program, the IP address of the client device and the measured round-trip times;
  determine whether the measured round-trip times are anomalous or within one or more expected ranges of time for the multiple location servers and for known client devices having a predetermined range of IP addresses including the IP address of the client device;
  for each pre-selected location server, determine an average round-trip time for the pre-selected location server according to the measured round-trip times for the pre-selected location server;
  determine whether one of the average round-trip times is anomalous or within the one or more expected ranges of time;
  perform a security action in response to determining that at least one of the average round-trip times is anomalous; and
  determine the one or more expected ranges of time based on a model of average round-trip times for the multiple preselected location servers and for client devices having a predetermined range of IP addresses comprising the IP address of the client device.

17. The system of claim 16, wherein a classification server is configured to perform the security action in response to the classification server determining the measured round-trip times are anomalous.

18. A non-transitory computer-readable storage medium comprising instructions that, when executed by a processing device, cause the processing device to:
send a computer program and web content to a client device,
  wherein the client device has an Internet Protocol address (IP address),
  wherein the computer program executes on the client device after it is received by the client device, and
  wherein the computer program measures round-trip times for messages the computer program sends to multiple pre-selected location servers at different distant locations and for corresponding reply messages that are returned to the computer program;
receive, from the computer program, the IP address of the client device and the measured round-trip times;
determine whether the measured round-trip times are anomalous or within one or more expected ranges of time for the multiple pre-selected location servers and for known client devices having a predetermined range of IP addresses including the IP address of the client device;

perform a security action in response to determining the measured round-trip times are anomalous;

for each pre-selected location server, determine an average round-trip time for the pre-selected location server according to the measured round-trip times for the pre-selected location server;

determine whether one of the average round-trip times is anomalous or within the one or more expected ranges of time;

perform the security action in response to determining that at least one of the average round-trip times is anomalous; and determine the one or more expected ranges of time based on a model of average round-trip times for the multiple preselected location servers and for client devices having a predetermined range of IP addresses comprising the IP address of the client device.

* * * * *